US011402276B2

(12) United States Patent
Ono et al.

(10) Patent No.: US 11,402,276 B2
(45) Date of Patent: Aug. 2, 2022

(54) BEARING TEMPERATURE DETECTOR OF RAILCAR BOGIE

(71) Applicant: KAWASAKI RAILCAR MANUFACTURING CO., LTD., Kobe (JP)

(72) Inventors: Takaya Ono, Kobe (JP); Yukitaka Taga, Kobe (JP); Fumikazu Kounoike, Kakogawa (JP)

(73) Assignee: KAWASAKI RAILCAR MANUFACTURING CO., LTD., Kobe (JP)

( * ) Notice: Subject to any disclaimer, the term of this patent is extended or adjusted under 35 U.S.C. 154(b) by 948 days.

(21) Appl. No.: 16/097,567

(22) PCT Filed: Mar. 21, 2017

(86) PCT No.: PCT/JP2017/011268
§ 371 (c)(1),
(2) Date: Oct. 29, 2018

(87) PCT Pub. No.: WO2017/187846
PCT Pub. Date: Nov. 2, 2017

(65) Prior Publication Data
US 2019/0162604 A1    May 30, 2019

(30) Foreign Application Priority Data
Apr. 27, 2016   (JP) .............................. JP2016-088906

(51) Int. Cl.
*G01K 13/08*    (2006.01)
*F16C 41/00*    (2006.01)
(Continued)

(52) U.S. Cl.
CPC .............. *G01K 13/08* (2013.01); *B61F 15/20* (2013.01); *B61K 9/04* (2013.01); *F16C 19/525* (2013.01);
(Continued)

(58) Field of Classification Search
CPC .......... G01K 13/08; G01K 1/143; G01K 1/14; B61F 15/20; B61K 9/04; F16C 19/525;
(Continued)

(56) References Cited

U.S. PATENT DOCUMENTS 6,220,749 B1 * 4/2001 Wyker ..................... G01K 1/14
374/141
2002/0141673 A1   10/2002 Ito et al.
(Continued)

FOREIGN PATENT DOCUMENTS

AU    2012276745 A1    12/2013
CN    104691570 A     6/2015
(Continued)

*Primary Examiner* — Lisa M Caputo
*Assistant Examiner* — Janice M Soto
(74) *Attorney, Agent, or Firm* — Oliff PLC

(57) ABSTRACT

A bearing temperature detector of a railcar bogie includes: a temperature sensor unit passing through an opening of an axle box accommodating a bearing supporting an axle and configured to detect a temperature of an outer ring of the bearing; an elastic body configured to bias the temperature sensor unit toward the outer ring; and a temperature sensor unit support seat including a substrate portion to which the temperature sensor unit is attached via the elastic body, the temperature sensor unit support seat being detachably fixed to the axle box from an outside of the axle box.

8 Claims, 6 Drawing Sheets

(51) Int. Cl.
*B61K 9/04* (2006.01)
*B61F 15/20* (2006.01)
*F16C 19/52* (2006.01)
*G01K 1/143* (2021.01)
*F16C 19/38* (2006.01)
*F16C 19/24* (2006.01)
*F16C 19/00* (2006.01)

(52) U.S. Cl.
CPC .............. *F16C 41/00* (2013.01); *G01K 1/143* (2013.01); *F16C 19/00* (2013.01); *F16C 19/24* (2013.01); *F16C 19/38* (2013.01); *F16C 2233/00* (2013.01); *F16C 2326/01* (2013.01); *F16C 2326/10* (2013.01)

(58) Field of Classification Search
CPC .......... F16C 41/00; F16C 19/00; F16C 19/24; F16C 19/38; F16C 2233/00; F16C 2326/01; F16C 2326/10
See application file for complete search history.

(56) References Cited

U.S. PATENT DOCUMENTS

| | | |
|---|---|---|
| 2009/0148092 A1 | 6/2009 | Otsuka |
| 2011/0253004 A1 | 10/2011 | Nishimura et al. |
| 2013/0342362 A1* | 12/2013 | Martin .................. B60T 13/665 340/870.16 |
| 2018/0170410 A1 | 6/2018 | Wang et al. |

FOREIGN PATENT DOCUMENTS

| | | | |
|---|---|---|---|
| JP | H08-239 U | | 2/1996 |
| JP | 2003-056557 A | | 2/2003 |
| JP | 2003056557 A | * | 2/2003 |
| JP | 2005-17147 A | | 1/2005 |
| JP | 2006-113014 A | | 4/2006 |
| JP | 2006-234102 A | | 9/2006 |
| JP | 2009-138824 A | | 6/2009 |
| JP | 2010-184684 A | | 8/2010 |
| JP | 2013-11312 A | | 1/2013 |
| JP | 2014-131897 A | | 7/2014 |

* cited by examiner

BEARING TEMPERATURE DETECTOR OF RAILCAR BOGIE

TECHNICAL FIELD

The present invention relates to a bearing temperature detector of a railcar bogie.

BACKGROUND ART

Known is a railcar bogie configured such that: a temperature sensor is provided at an axle box accommodating a bearing supporting an axle; and the temperature sensor detects the temperature of an outer ring of the bearing to detect an abnormal temperature rise of the bearing (see PTL 1, for example).

CITATION LIST

Patent Literature

PTL 1: Japanese Laid-Open Patent Application Publication No. 2006-234102

SUMMARY OF INVENTION

Technical Problem

The outer ring of the bearing fitted to the axle box can be slightly displaced in a direction toward or away from the axle box. On this account, there is a possibility that the contact of the temperature sensor with the outer ring of the bearing becomes unstable due to influences of, for example, vibrations of the bogie, and therefore, the temperature sensor cannot accurately detect the temperature.

An object of the present invention is to accurately detect a temperature of an outer ring of a bearing accommodated in an axle box of a railcar bogie.

Solution to Problem

A bearing temperature detector of a railcar bogie according to one aspect of the present invention includes: a temperature sensor unit passing through an opening of an axle box accommodating a bearing supporting an axle and configured to detect a temperature of an outer ring of the bearing; an elastic body configured to bias the temperature sensor unit toward the outer ring; and a temperature sensor unit support seat including a substrate portion to which the temperature sensor unit is attached via the elastic body, the temperature sensor unit support seat being detachably fixed to the axle box from an outside of the axle box.

According to the above configuration, the temperature sensor unit is biased by the elastic body so as to press the outer ring of the bearing. Therefore, even when vibrations or the like of the bogie occur, the temperature sensor unit can stably and accurately detect the temperature of the outer ring. In addition, since a set of the temperature sensor unit, the elastic body, and the temperature sensor unit support seat can be attached to and detached from the axle box, maintenance of the temperature sensor unit and the like can be performed without disassembling the axle box. Thus, excellent work efficiency can be kept.

Advantageous Effects of Invention

According to the present invention, the temperature of the outer ring of the bearing accommodated in the axle box of the railcar bogie can be accurately detected, and excellent maintenance work efficiency can be kept.

DESCRIPTION OF EMBODIMENTS

Hereinafter, embodiments will be explained with reference to the drawings. In the following explanations, a direction in which a railcar travels and a carbody extends is defined as a car longitudinal direction, and a crosswise direction perpendicular to the car longitudinal direction is defined as a car width direction. The car longitudinal direction is also referred to as a front-rear direction, and the car width direction is also referred to as a left-right direction.

Embodiment 1

Figure 1:
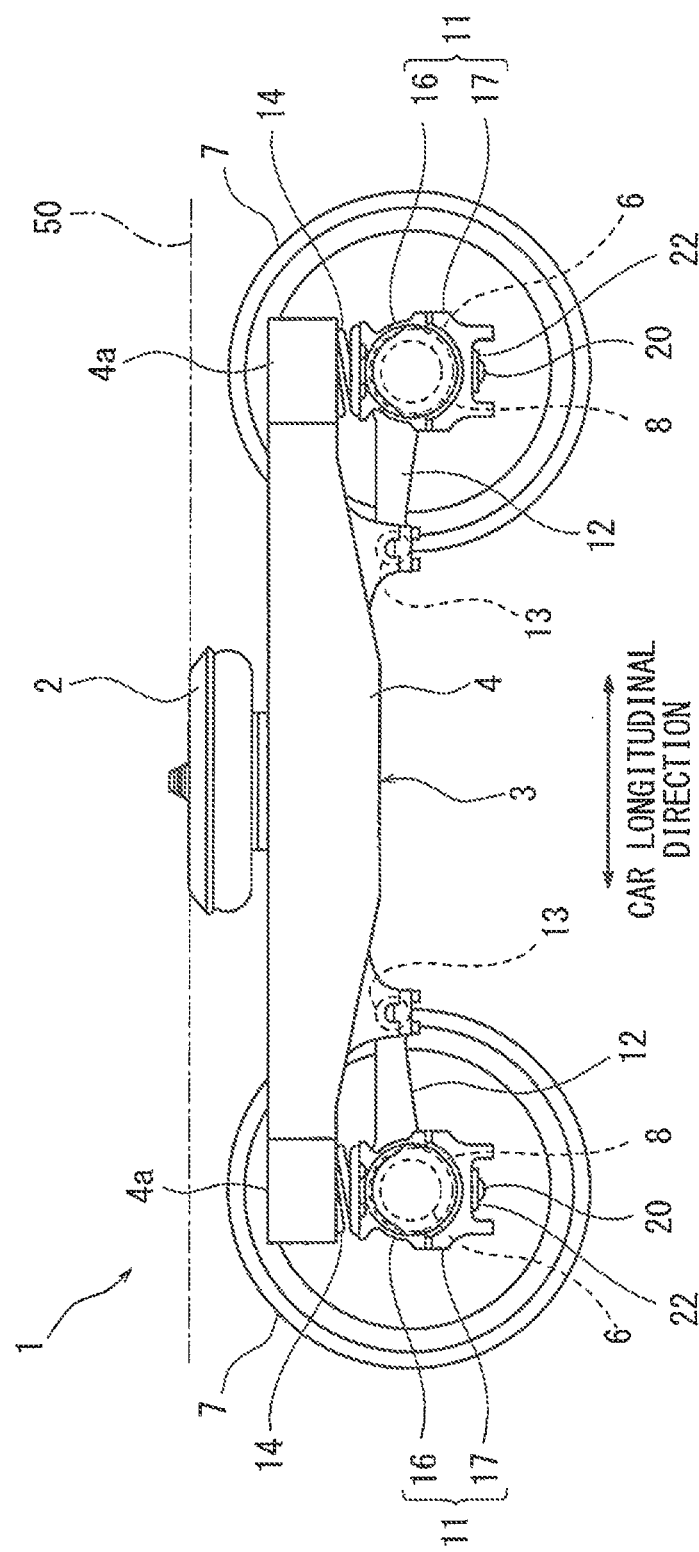
FIG. 1 is a side view of a railcar bogie according to Embodiment 1.

FIG. 1 is a side view of a railcar bogie 1 according to Embodiment 1. As shown in FIG. 1, the railcar bogie 1 includes a bogie frame 3 supporting a carbody 50 through an air spring 2. The bogie frame 3 includes a pair of side sills 4 and a cross beam (not shown) and is formed in an H shape in a plan view. The side sills 4 are located at both respective car width direction sides of the bogie frame 3 and extend in the car longitudinal direction. The cross beam couples the side sills 4 to each other and extends in the car width direction. Axles 6 extending in the car width direction are arranged at both respective car longitudinal direction sides of the bogie frame 3. Wheels 7 are fixed to both respective car width direction side portions of each of the axles 6. Bearings 8 rotatably supporting the axle 6 are provided at both respective car width direction end portions of the axle 6 so as to be located outside the respective wheels 7 in the car width direction. Each of the bearings 8 includes an inner ring (not shown), an outer ring 8a (see FIG. 2), and a rolling element (not shown) sandwiched between the inner ring and the outer ring 8a. The bearings 8 are accommodated in respective axle boxes 11.

An axle box main body 16 of the axle box 11 and an axle beam 12 are formed integrally with each other. The axle beam 12 is coupled to the bogie frame 3. A tip end portion of the axle beam 12 is elastically coupled to the bogie frame 3 through, for example, a rubber bushing 13. A coil spring 14 configured to expand and contract in a vertical direction is interposed between a car longitudinal direction end portion 4a of the side sill 4 and the axle box 11. A temperature sensor unit 20 is attached to a lower portion of the axle box 11.

Figure 2:
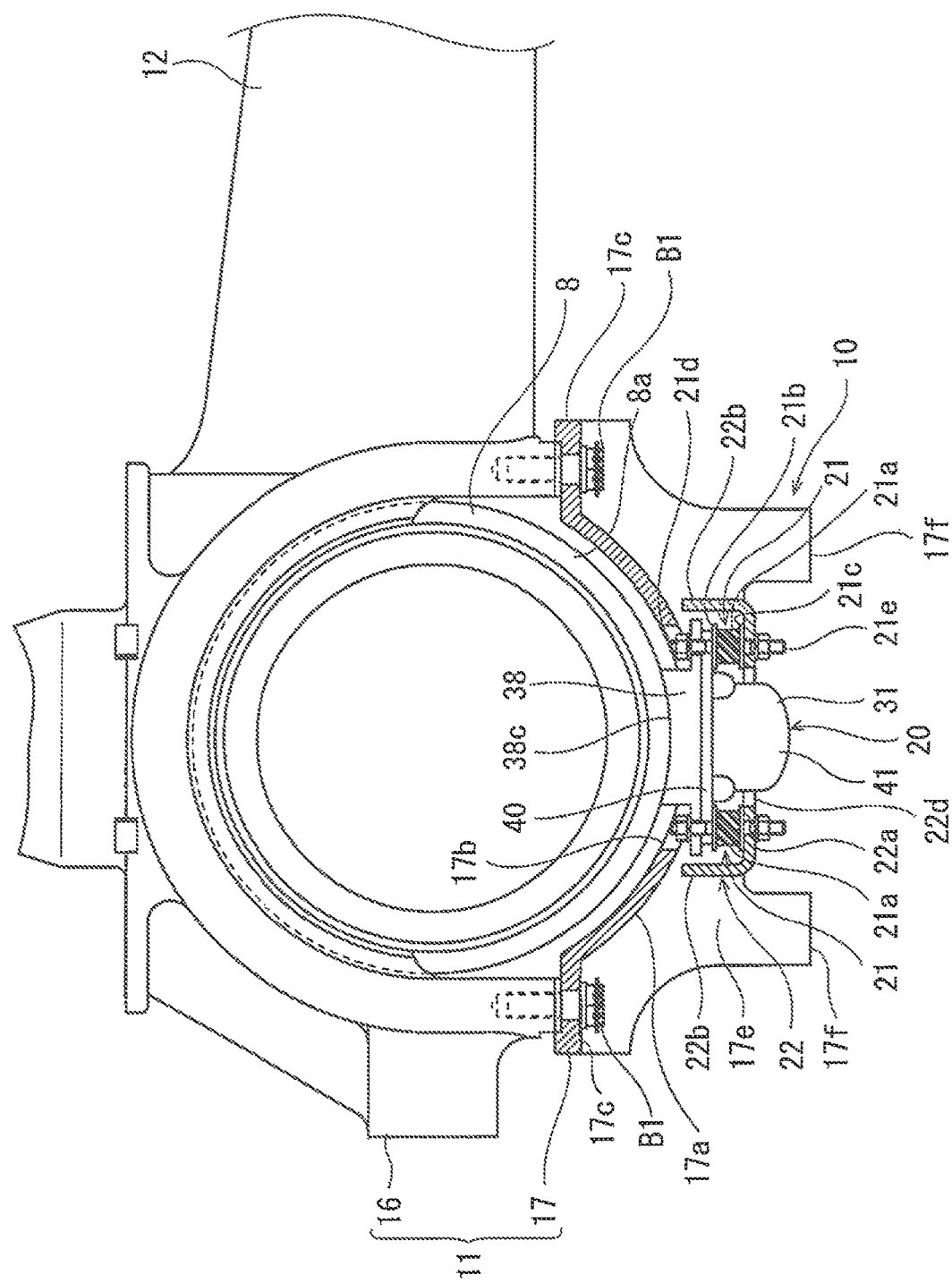
FIG. 2 is a partial sectional side view of major components of the bogie shown in FIG. 1.
Figure 3:
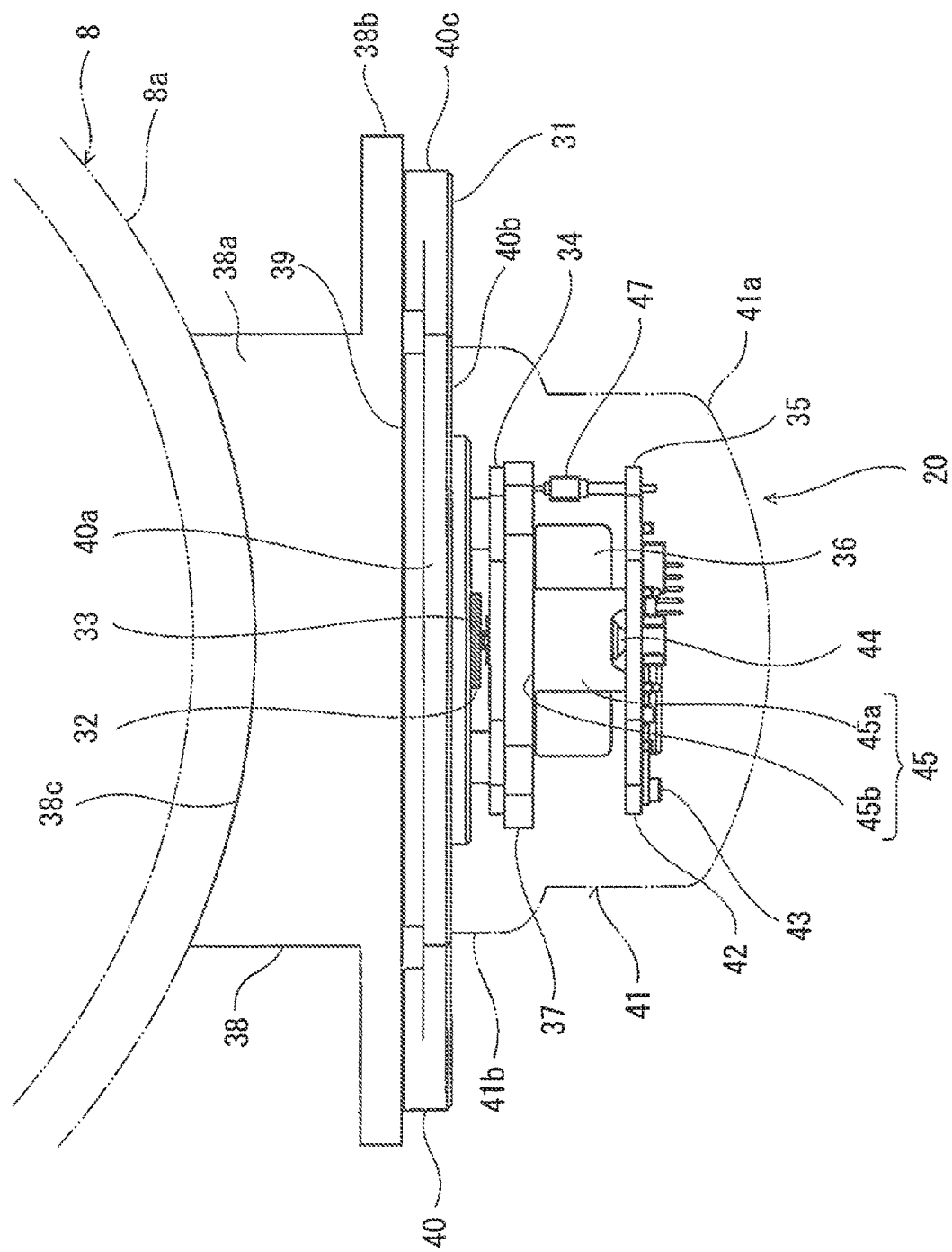
FIG. 3 is a side view of a temperature sensor unit shown in FIG. 2.

FIG. 2 is a partial sectional side view of major components of the bogie 1 shown in FIG. 1. FIG. 3 is a side view of the temperature sensor unit 20 shown in FIG. 2. As shown in FIG. 2, the axle box 11 includes the axle box main body 16 and a wheelset support 17. The axle box main body 16 covers an upper region of an outer peripheral surface of the outer ring 8a of the bearing 8 and supports a load from the bogie frame 3. The wheelset support 17 covers a lower region of the outer peripheral surface of the outer ring 8a of the bearing 8. To be specific, the wheelset support 17 constitutes a part of the axle box 11 and corresponds to an axle box lower portion covering the outer ring 8a from below. The wheelset support 17 is detachably fixed to the axle box main body 16 by bolts B1.

The temperature sensor unit 20 is attached to a temperature sensor unit support seat 22 through elastic devices 21. The temperature sensor unit support seat 22 is detachably fixed to the wheelset support 17 by bolts B2 (see FIG. 6). The wheelset support 17 includes a cover portion 17a and an opening 17b formed at the cover portion 17a. The cover portion 17a is opposed to the bearing 8 from below with a gap. The temperature sensor unit 20 is inserted into the opening 17b of the cover portion 17a of the wheelset support 17 from below.

As shown in FIGS. 2 and 3, the temperature sensor unit 20 includes a housing 31, a thermal conduction sheet 32, a temperature sensor 33, a sensor substrate 34, a wireless communication board 35, a battery 36, and a heat insulating member 37. The temperature sensor unit 20 has a temperature detection function, a wireless communication function, and a power supply function. The housing 31 is a casing accommodating the thermal conduction sheet 32, the temperature sensor 33, the sensor substrate 34, the wireless communication board 35, the battery 36, and the heat insulating member 37.

The housing 31 includes a contact member 38, a thermal conduction sheet 39, a base plate 40, and a cover 41. The contact member 38 and the base plate 40 are made of metal having thermal conductivity. For example, the contact member 38 and the base plate 40 are made of an aluminum alloy. The thermal conduction sheet 39 is made of a material having elasticity and thermal conductivity, and for example, is made of thermally-conductive silicone rubber. The cover 41 is made of electrically-nonconductive resin, and for example, is made of glass fiber-reinforced resin.

The contact member 38 includes a heat receiving portion 38a and an attachment portion 38b. The heat receiving portion 38a includes a circular-arc heat receiving surface 38c (upper surface) that is in surface contact with the outer peripheral surface of the outer ring 8a of the bearing 8. The attachment portion 38b projects from the heat receiving portion 38a toward a lateral side. The thermal conduction sheet 39 is sandwiched in a compressed state between the contact member 38 and the base plate 40.

The base plate 40 includes a main body portion 40a, a cover attachment portion 40b provided around the main body portion 40a, and an attachment portion 40c projecting from the cover attachment portion 40b toward a lateral side. The main body portion 40a holds the thermal conduction sheet 32, the temperature sensor 33, the sensor substrate 34, the wireless communication board 35, the battery 36, and the heat insulating member 37. The attachment portion 38b of the contact member 38 and the attachment portion 40c of the base plate 40 are attached to the wheelset support 17 through the elastic devices 21.

The cover 41 includes: an accommodating portion 41a having a concave section; and a flange portion 41b projecting from the accommodating portion 41a toward a lateral side. The accommodating portion 41a has a bottomed cylindrical shape. The cover 41 is attached to the cover attachment portion 40b of the base plate 40 by screws (not shown). The cover 41 covers the thermal conduction sheet 32, the temperature sensor 33, the sensor substrate 34, the wireless communication board 35, the battery 36, and the heat insulating member 37 from below.

The thermal conduction sheet 32 has an electric insulation property and is sandwiched in a compressed state between the base plate 40 and the temperature sensor 33. To be specific, a detecting portion of the temperature sensor 33 is pressed against the thermal conduction sheet 32. The thermal conduction sheet 32 is made of a material having the electric insulation property, the elasticity, and the thermal conductivity, and for example, is made of thermally-conductive silicone rubber. Heat of the outer ring 8a of the bearing 8 is transferred to the contact member 38, the thermal conduction sheet 39, the base plate 40, the thermal conduction sheet 32, and the temperature sensor 33 in this order.

The temperature sensor 33 is mounted on an upper surface of the sensor substrate 34. The sensor substrate 34 includes a sensor circuit configured to output information about the temperature of the outer ring 8a as an analog temperature signal to a below-described conversion substrate 42, the temperature being detected by the temperature sensor 33. The wireless communication board 35 includes the conversion substrate 42 and a wireless communication module 43 (wireless transmission portion). The conversion substrate 42 includes a conversion circuit configured to convert the analog temperature signal, output from the temperature sensor 33, into a digital temperature signal. The conversion substrate 42 and the sensor substrate 34 are connected to each other through a connector 47 extending in the vertical direction. The wireless communication module 43 is mounted on the conversion substrate 42 and wirelessly transmits the digital temperature signal, output from the conversion substrate 42, to an outside of the temperature sensor unit 20 (for example, to a wireless receiver of the railcar) as a wireless signal.

The battery 36 stores electric power which is supplied to the temperature sensor 33, the sensor substrate 34, and the wireless communication board 35. A first electrode 44 and a second electrode 45 are provided on an upper surface of the wireless communication board 35. The first electrode 44 is one of positive and negative electrodes, and the second electrode 45 is the other of the positive and negative electrodes. The first electrode 44 contacts an electrode of one of surfaces of the battery 36, and the second electrode 45 contacts an electrode of the other surface of the battery 36. The second electrode 45 includes a vertical plate portion 45a and a horizontal plate portion 45b. The vertical plate portion 45a projects from the wireless communication board 35, and the horizontal plate portion 45b projects from the vertical plate portion 45a along the other surface of the battery 36. The battery 36 is sandwiched between the horizontal plate portion 45b of the second electrode 45 and the first electrode 44.

Electric power from the battery 36 is supplied to the wireless communication board 35 through the first electrode 44 and the second electrode 45 and then supplied from the wireless communication board 35 to the sensor substrate 34 and the temperature sensor 33. The heat insulating member 37 is interposed between the sensor substrate 34 and the battery 36 and is larger in area than the battery 36. The contact member 38, the thermal conduction sheet 39, the base plate 40, the thermal conduction sheet 32, the temperature sensor 33, the sensor substrate 34, the heat insulating member 37, the battery 36, and the wireless communication board 35 are arranged in the temperature sensor unit 20 in this order from an upper side to a lower side.

Figure 4:
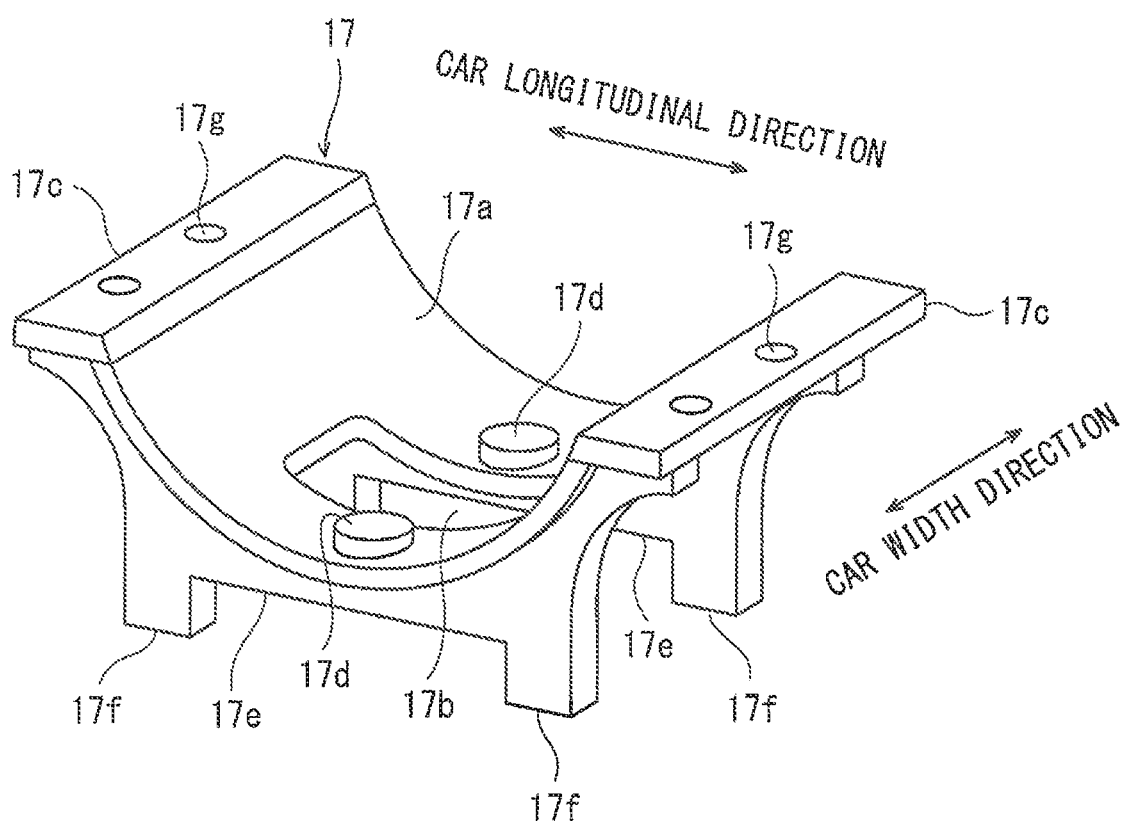
FIG. 4 is a perspective view of a wheelset support shown in FIG. 2 when viewed obliquely from above.
Figure 5:
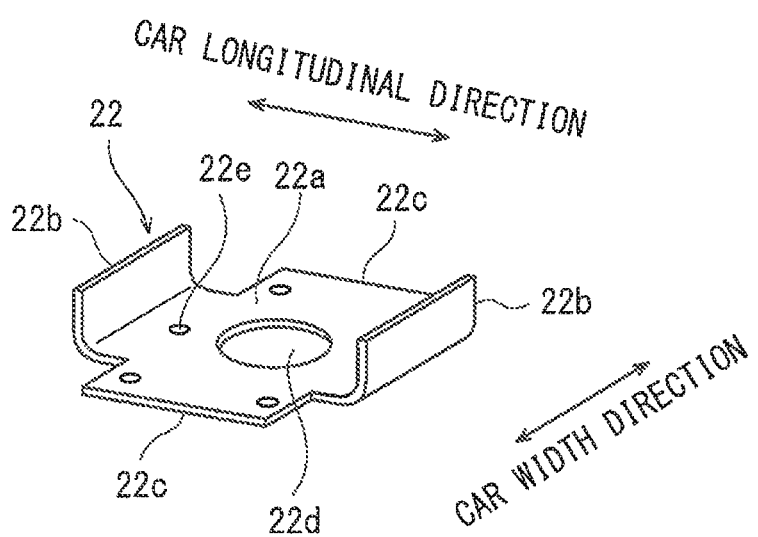
FIG. 5 is a perspective view of a temperature sensor unit support seat shown in FIG. 2 when viewed obliquely from above.
Figure 6:
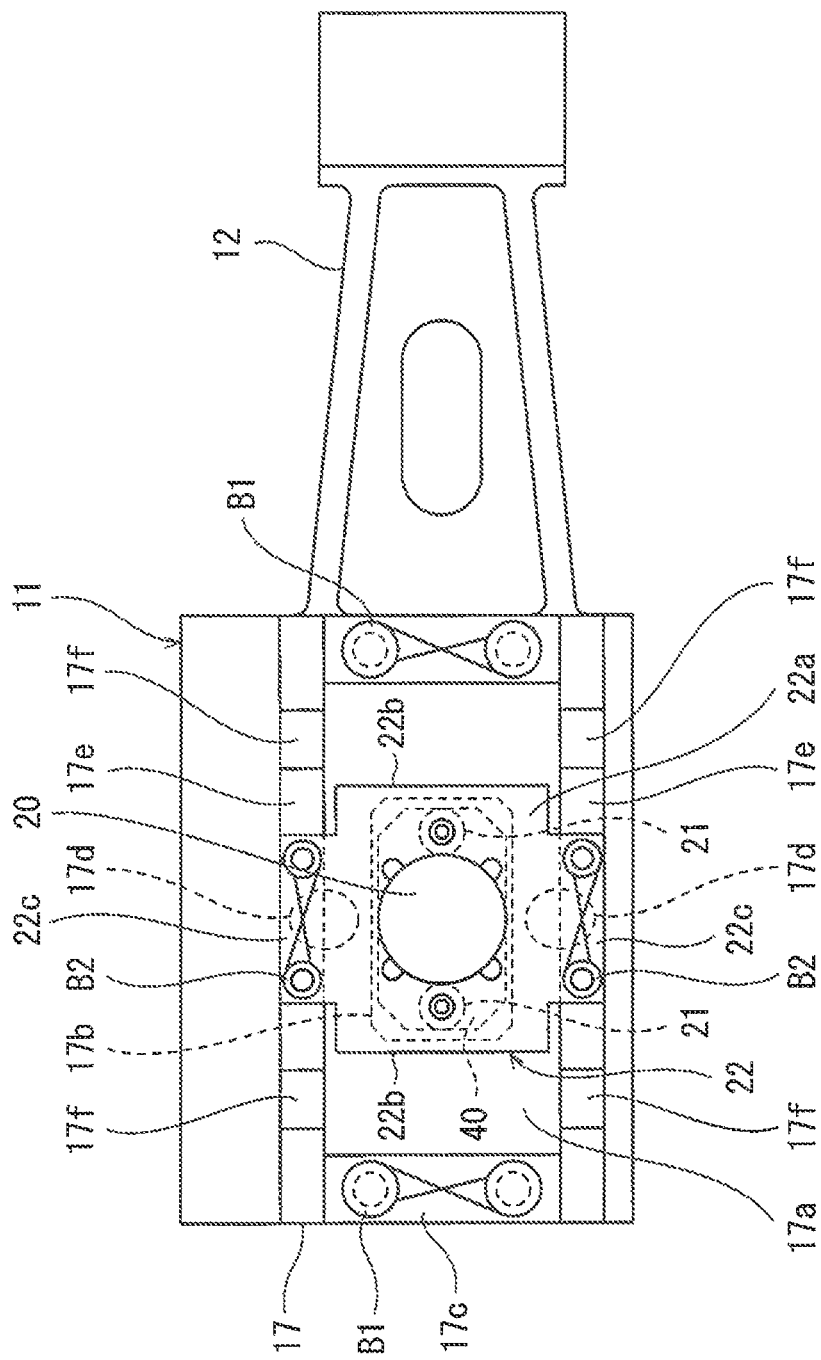
FIG. 6 is a bottom view of an axle box and the like shown in FIG. 2.

FIG. 4 is a perspective view of the wheelset support 17 shown in FIG. 2 when viewed obliquely from above. FIG. 5 is a perspective view of the temperature sensor unit support seat 22 shown in FIG. 2 when viewed obliquely from above. FIG. 6 is a bottom view of the axle box 11 and the like shown in FIG. 2. As shown in FIG. 4, the wheelset support 17 includes the cover portion 17a, the opening 17b, a pair of fixing portions 17c, a pair of outer ring supporting portions 17d, a pair of side wall portions 17e, and four leg portions 17f. The wheelset support 17 is made of metal. The cover portion 17a is opposed to the bearing 8 from below with a gap and is formed in a circular-arc shape in a side view. The opening 17b is formed at a car width direction middle and car longitudinal direction middle of the cover portion 17a and has such a shape that a car longitudinal direction size thereof is longer than a car width direction size thereof.

The fixing portions 17c project from both respective car longitudinal direction ends of the cover portion 17a like flanges, and bolt holes 17g are formed at the fixing portions 17c. The fixing portions 17c are detachably fixed to the axle box main body 16 by the bolts B1 inserted into the bolt holes 17g. The outer ring supporting portions 17d are provided at a car longitudinal direction middle of the cover portion 17a and project upward from both respective car width direction sides of the opening 17b. Normally, the outer ring supporting portions 17d do not contact the outer ring 8a. When the axle 6 (7) is lifted up, the outer ring supporting portions 17d support the outer ring 8a of the bearing 8 from below. The side wall portions 17e project downward from both respective car width direction side positions of a bottom surface of the cover portion 17a. The four leg portions 17f project downward from both respective car longitudinal direction side positions of bottom surfaces of the side wall portions 17e. To be specific, lower ends of the leg portions 17f are located lower than lower ends of the side wall portions 17e.

As shown in FIG. 5, the temperature sensor unit support seat 22 includes a substrate portion 22a, a pair of side plate portions 22b, and a pair of fixing portions 22c. The temperature sensor unit support seat 22 is made of metal. The substrate portion 22a is opposed to the cover portion 17a of the wheelset support 17 from below with a gap. An insertion hole 22d into which the temperature sensor unit 20 is inserted is formed at the substrate portion 22a. A pair of attachment holes 22e are formed at the substrate portion 22a so as to be located at both respective car longitudinal direction sides of the insertion hole 22d. The temperature sensor unit 20 is attached to the attachment holes 22e through the below-described elastic devices 21. The side plate portions 22b project from both respective car longitudinal direction sides of the substrate portion 22a toward the axle box 11 and cover the temperature sensor unit 20 from the car longitudinal direction.

As shown in FIG. 2, the pair of elastic devices 21 are arranged at both respective circumferential direction sides of the outer ring 8a when viewed from the heat receiving surface 38c. The elastic device 21 includes: an elastic body 21a; an upper fixture 21b provided at an upper surface of the elastic body 21a and made of metal; and a lower fixture 21c provided at a lower surface of the elastic body 21a and made of metal. The upper fixture 21b and the lower fixture 21c are displaceable relative to each other in the vertical direction and a horizontal direction by elastic deformation of the elastic body 21a.

The upper fixture 21b is fixed to the temperature sensor unit 20. Specifically, the upper fixture 21b is fixed to the attachment portion 38b of the contact member 38 and the attachment portion 40c of the base plate 40 (see FIG. 3). The upper fixture 21b includes an upper stud bolt 21d projecting upward. The attachment portion 38b of the contact member 38 and the attachment portion 40c of the base plate 40 are fixed to the upper stud bolt 21d by a nut. The lower fixture 21c is fixed to the substrate portion 22a of the temperature sensor unit support seat 22. The lower fixture 21c includes a lower stud bolt 21e projecting downward. The temperature sensor unit support seat 22 is fixed to the lower stud bolt 21e by a nut. The elastic device 21 is provided with the elastic body 21a compressed in the vertical direction. The elastic device 21 biases the temperature sensor unit 20 upward such that the temperature sensor unit 20 is pressed against the outer ring 8a.

As shown in FIGS. 2 and 6, the contact member 38 of the temperature sensor unit 20 passes through the opening 17b of the wheelset support 17 and contacts the outer ring 8a of the bearing 8. Each of the side plate portions 22b of the temperature sensor unit support seat 22 is opposed to the temperature sensor unit 20 from a car longitudinal direction outer side with a gap. Each of the side wall portions 17e of the wheelset support 17 is opposed to the temperature sensor unit 20 from the car width direction outer side with a gap. To be specific, the temperature sensor unit 20 is surrounded by the side plate portions 22b of the temperature sensor unit support seat 22 and the side wall portions 17e of the wheelset support 17. The fixing portions 22c of the temperature sensor unit support seat 22 are detachably fixed to the side wall portions 17e of the wheelset support 17 by the bolts B2. It should be noted that the bolt B2 by which the temperature sensor unit support seat 22 is fixed to the wheelset support 17 is smaller than the bolt B1 by which the wheelset support 17 is fixed to the axle box main body 16.

The temperature sensor unit 20 projects downward through the insertion hole 22d of the temperature sensor unit support seat 22 beyond the temperature sensor unit support seat 22 and is exposed to an outside of the temperature sensor unit support seat 22. With this, the wireless communication module 43 of the temperature sensor unit 20 passes through the insertion hole 22d of the temperature sensor unit support seat 22. A lower end of the temperature sensor unit 20 is located lower than the lower ends of the side wall portions 17e of the wheelset support 17 and higher than the lower ends of the leg portions 17f of the wheelset support 17. The temperature sensor unit 20 is displaceable relative to the axle box 11 in a predetermined range around a rotation axis of the bearing 8 by the elastic deformation of the elastic body 21a. When the temperature sensor unit 20 is displaced along the outer ring 8a, the side plate portion 22b of the temperature sensor unit support seat 22 interferes with the attachment portion 38b of the contact member 38 to restrict the displacement of the temperature sensor unit 20 within the predetermined range. As above, the temperature sensor unit 20, the elastic devices 21, the temperature sensor unit support seat 22, and the wheelset support 17 constitute a bearing temperature detector 10.

According to the above-explained configuration, the temperature sensor unit 20 is biased by the elastic bodies 21a so as to press the outer ring 8a of the bearing 8. Therefore, even when vibrations or the like of the bogie 1 occur, the temperature sensor unit 20 can stably and accurately detect the temperature of the outer ring 8a. In addition, since a set of the temperature sensor unit 20, the elastic bodies 21a, and the temperature sensor unit support seat 22 can be attached to and detached from the axle box 11, maintenance of the temperature sensor unit 20 and the like can be performed without disassembling the axle box 11. Thus, excellent work efficiency can be kept.

Further, the insertion hole 22d through which the wireless communication module 43 of the temperature sensor unit 20 passes is formed at the substrate portion 22a of the temperature sensor unit support seat 22. On this account, an electric wave of the wireless communication module 43 is not inhibited by the temperature sensor unit support seat 22, and therefore, communication stability is excellent. Further, each of the side plate portions 22b of the temperature sensor unit support seat 22 is opposed to the housing 31 of the temperature sensor unit 20 (the attachment portion 38b of the contact member 38) from a car longitudinal direction outer side with a gap. Therefore, the displacement of the temperature sensor unit 20 in the car longitudinal direction can be restricted by the side plate portions 22b. Further, the side plate portions 22b can prevent traveling wind from hitting the temperature sensor unit 20, and therefore, the temperature detection accuracy of the temperature sensor unit 20 can be prevented from deteriorating.

The opening 17b into which the temperature sensor unit 20 is inserted is formed at the wheelset support 17. Therefore, the axle box main body 16 of the axle box 11 may be the same as the axle box main body 16 of the axle box 11 of the bogie on which the bearing temperature detector is not mounted. Thus, the components of the bogie can be used in common, and an additional bearing temperature detector can be easily mounted on an existing bogie.

The outer ring supporting portions 17d are provided at both respective car width direction sides of the opening 17b of the wheelset support 17. Therefore, although the opening 17b is formed at a car longitudinal direction middle of the wheelset support 17, the wheelset support 17 can appropriately support the bearing 8 when the axle 6 (7) is lifted up. The wheelset support 17 includes the pair of side wall portions 17e opposed to the temperature sensor unit 20 from both respective car width direction sides with a gap, and the temperature sensor unit support seat 22 is fixed to the side wall portions 17e. On this account, the traveling wind can be prevented from hitting the temperature sensor unit 20, and therefore, the temperature detection accuracy of the temperature sensor unit 20 can be further prevented from deteriorating. Further, the lower ends of the leg portions 17f of the wheelset support 17 are located lower than the lower end of the temperature sensor unit 20. Therefore, for wheel grinding work, when a lifting apparatus (not shown) pushes the lower ends of the leg portions 17f upward to lift up the wheel 7 together with the axle box 11, it is unnecessary to detach the temperature sensor unit 20, and the temperature sensor unit 20 can be prevented from being damaged by the lifting apparatus.

Embodiment 2

Figure 7:
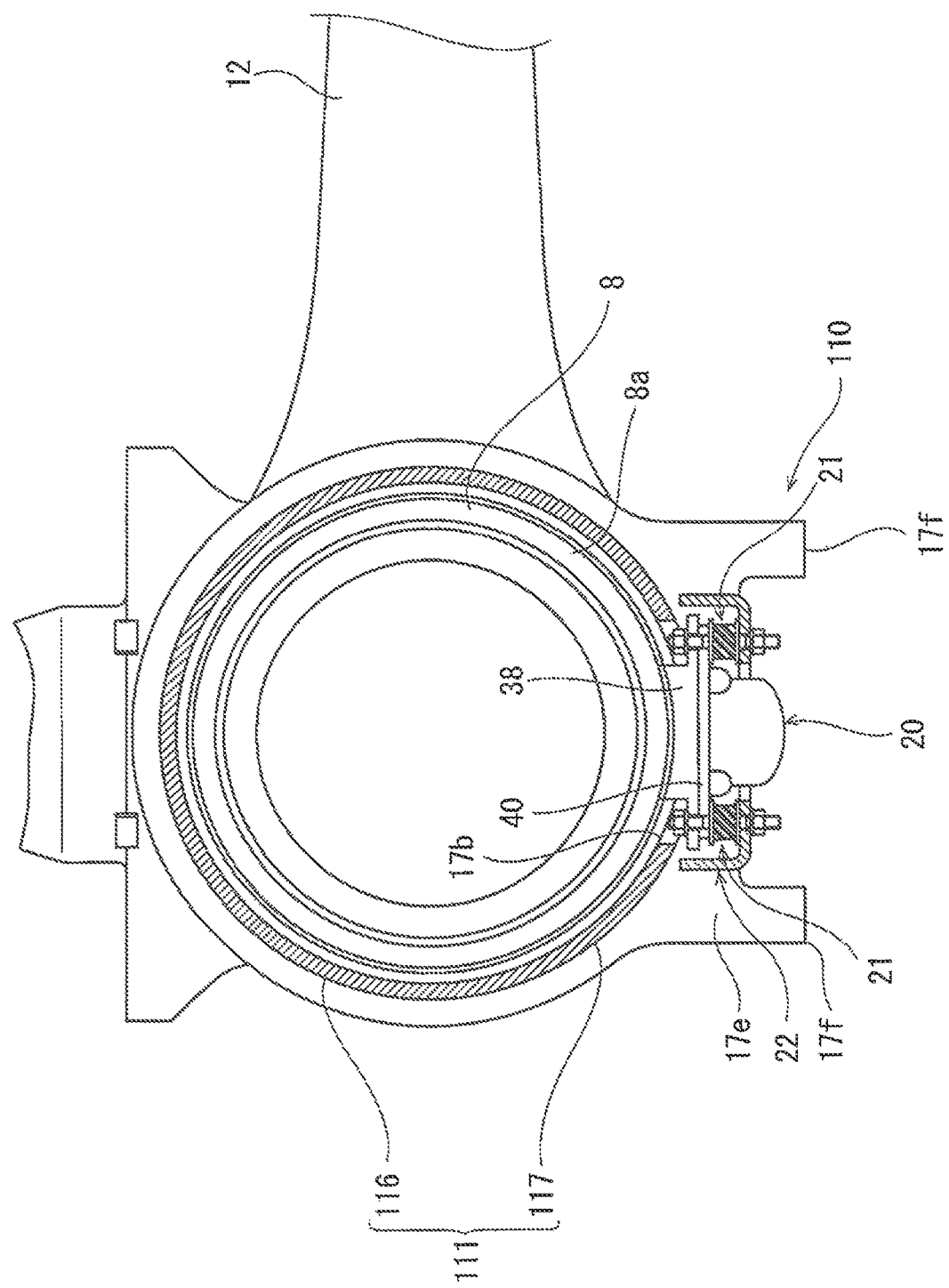
FIG. 7 is a partial sectional side view of major components of the bogie according to Embodiment 2.

FIG. 7 is a partial sectional side view of major components of the bogie according to Embodiment 2. It should be noted that the same reference signs are used for the same components as in Embodiment 1, and a repetition of the same explanation is avoided. In Embodiment 1, the wheelset support 17 and the axle box main body 16 are formed as separate members. However, in Embodiment 2, the wheelset support 17 and the axle box main body 16 are formed as an integrated structure. As shown in FIG. 7, an axle box 111 in Embodiment 2 is an integrally-molded tubular body, and the axle beam 12 is also integrated with the axle box 111. A bearing temperature detector 110 includes the temperature sensor unit 20, the elastic devices 21, the temperature sensor unit support seat 22, and the axle box 111. The axle box 111 includes: an axle box upper portion 116 covering the upper region of the outer peripheral surface of the outer ring 8a of the bearing 8; and an axle box lower portion 117 covering the lower region of the outer peripheral surface of the outer ring 8a of the bearing 8.

The axle box lower portion 117 includes the opening 17b, the pair of outer ring supporting portions (see reference signs 17d in FIG. 4), the pair of side wall portions 17e, and the four leg portions 17f. The opening 17b is formed at a car width direction middle and car longitudinal direction middle of the axle box lower portion 117. The outer ring supporting portions (see reference signs 17d in FIG. 4) are provided at a car longitudinal direction middle of the axle box lower portion 117 and project upward from both respective car width direction sides of the opening 17b. The side wall portions 17e project downward from both respective car width direction side portions of a bottom surface of the axle box lower portion 117. The four leg portions 17f project downward from both respective car longitudinal direction side portions of bottom surfaces of the side wall portions 17e. The contact member 38 of the temperature sensor unit 20 passes through the opening 17b of the axle box lower portion 117 and contacts the outer ring 8a of the bearing 8. It should be noted that since the other components are the same as those in Embodiment 1, explanations thereof are omitted.

The present invention is not limited to the above embodiments, and modifications, additions, and eliminations may be made with respect to the configuration of the present invention. The bogie 1 may be configured to include plate springs instead of the side sills 4 and the coil springs 14. To be specific, the bogie 1 may be configured such that a pair of front and rear axle boxes support both respective longitudinal direction end portions of each of the plate springs, and longitudinal direction middle portions of the plate springs support a cross beam. Further, instead of the configuration in which the side wall portions 17e are provided at both respective car width direction sides of the temperature sensor unit 20, and the side plate portions 22b of the temperature sensor unit support seat 22 are provided at both respective car longitudinal direction sides of the temperature sensor unit 20, the configuration may be such that the side wall portions are provided at both respective car longitudinal direction sides of the temperature sensor unit 20, and the side plate portions of the temperature sensor unit support seat are provided at both respective car width direction sides of the temperature sensor unit 20. The temperature sensor unit 20 may be arranged at a position obliquely under the bearing 8, instead of a position right under the bearing 8. Further, the above embodiments have explained the axle beam type axle box suspension as one example but are not limited to this. The above embodiments are applicable to various axle box suspensions.

REFERENCE SIGNS LIST 1 bogie
6 axle
8 bearing
8a outer ring
10, 110 bearing temperature detector
11, 111 axle box
17 wheelset support (axle box lower portion)
117 axle box lower portion 17a cover portion
17b opening
17d outer ring supporting portion
17e side wall portion
17f leg portion
20 temperature sensor unit
21a elastic body
22 temperature sensor unit support seat
22a substrate portion
22b side plate portion
22d insertion hole
43 wireless communication module (wireless transmission portion)

The invention claimed is:

1. A bearing temperature detector of a railcar bogie, the bearing temperature detector comprising:
a temperature sensor passing through an opening of an axle box, the axle box accommodating a bearing supporting an axle and the temperature sensor being configured to detect a temperature of an outer ring of the bearing;
a pair of elastic bodies configured to bias the temperature sensor toward the outer ring, the pair of elastic bodies respectively arranged at a first side and a second side of the temperature sensor; and
a temperature sensor support seat including a substrate, the temperature sensor being attached to the substrate via the pair of elastic bodies, and the temperature sensor support seat being detachably fixed to the axle box from an outside of the axle box, wherein
each of the pair of elastic bodies are sandwiched between the temperature sensor support seat and the temperature sensor.

2. The bearing temperature detector according to claim 1, wherein:
the temperature sensor includes a wireless transmitter configured to transmit information of a detected temperature as a wireless signal;
an insertion hole is formed at the substrate; and
the temperature sensor is inserted into the insertion hole and exposed to an outside of the temperature sensor support seat.

3. The bearing temperature detector according to claim 1, wherein the temperature sensor support seat includes a side plate portion projecting from the substrate toward the axle box, the side plate portion covering the temperature sensor and including a gap between the side plate portion and the temperature sensor.

4. A bearing temperature detector of a railcar bogie, the bearing temperature detector comprising:
a temperature sensor passing through an opening of an axle box, the axle box accommodating a bearing supporting an axle, and the temperature sensor being configured to detect a temperature of an outer ring of the bearing;
an elastic body configured to bias the temperature sensor toward the outer ring;
a temperature sensor support seat including a substrate, the temperature sensor being attached to the substrate via the elastic body, and the temperature sensor support seat being detachable fixed to the axle box from an outside of the axle box; and
an axle box lower portion constituting a part of the axle box, the axle box lower portion covering the outer ring from below, wherein
the opening is formed at a part of the axle box lower portion, the part of the axle box lower portion being opposed to the bearing and including a gap between the part of the axle box lower portion and the bearing.

5. The bearing temperature detector according to claim 4, wherein the axle box lower portion further includes outer ring supporting portions located at both respective car width direction sides of the opening, the outer ring supporting portions projecting upward and supporting the outer ring.

6. The bearing temperature detector according to claim 4, wherein:
the axle box lower portion further includes a side wall portion projecting downward, the side wall portion being opposed to the axle box lower portion and including a gap between the side wall portion and the axle box lower portion; and
the temperature sensor support seat is detachably fixed to the side wall portion at the outside of the axle box.

7. The bearing temperature detector according to claim 4, wherein:
the axle box lower portion further includes a leg portion projecting downward;
the temperature sensor projects lower than the temperature sensor support seat; and
a lower end of the leg portion is located lower than a lower end of the temperature sensor.

8. The bearing temperature detector according to claim 4, wherein the axle box lower portion is a wheelset support detachably fixed to an axle box main body, the axle box main body covering the outer ring from above.

* * * * *